United States Patent
Yeh et al.

(10) Patent No.: US 9,301,249 B2
(45) Date of Patent: Mar. 29, 2016

(54) PORTABLE ROUTING DEVICE AND A ROUTING METHOD

(71) Applicants: Hung-Yao Yeh, Taipei (TW); Yi-Jang Wu, Tainan (TW)

(72) Inventors: Hung-Yao Yeh, Taipei (TW); Yi-Jang Wu, Tainan (TW)

(73) Assignee: Hung-Yao Yeh, Taipei (TW)

( * ) Notice: Subject to any disclaimer, the term of this patent is extended or adjusted under 35 U.S.C. 154(b) by 156 days.

(21) Appl. No.: 14/094,432

(22) Filed: Dec. 2, 2013

(65) Prior Publication Data

US 2014/0153465 A1    Jun. 5, 2014

(30) Foreign Application Priority Data

Nov. 30, 2012 (TW) ............................. 101144875 A

(51) Int. Cl.
*H04W 52/02*    (2009.01)
*H04W 88/04*    (2009.01)

(52) U.S. Cl.
CPC .......... *H04W 52/0203* (2013.01); *H04W 88/04* (2013.01); *Y02B 60/50* (2013.01)

(58) Field of Classification Search
None
See application file for complete search history.

(56) References Cited

U.S. PATENT DOCUMENTS

| 2002/0118663 | A1* | 8/2002 | Dorenbosch et al. | 370/338 |
| 2008/0095113 | A1* | 4/2008 | Kim et al. | 370/331 |
| 2011/0149928 | A1* | 6/2011 | Wu et al. | 370/338 |
| 2012/0236770 | A1* | 9/2012 | Yeh | 370/311 |
| 2014/0036879 | A1* | 2/2014 | Pirskanen | 370/336 |
| 2014/0153465 | A1* | 6/2014 | Yeh et al. | 370/311 |

FOREIGN PATENT DOCUMENTS

| TW | 200740153 | 10/2007 |
| TW | 201026123 | 7/2010 |
| TW | 201212582 | 3/2012 |
| TW | 201240384 | 10/2012 |
| WO | 2012136160 | 11/2012 |
| WO | WO 2012147270 A1 * | 11/2012 |

* cited by examiner

*Primary Examiner* — Benjamin H Elliott, IV
(74) *Attorney, Agent, or Firm* — Foster Pepper PLLC; Richard A. Koske; P. G. Scott Born

(57) ABSTRACT

The present invention discloses a portable routing device. One of the main features of the present invention is that the present invention utilizes a domain name signal as a switch on signal of a routing module of the portable routing device to maintain the off status of the routing module so as to saving power thereby. In another way, the present invention further capable of switching off the routing function thereof by determining if any network source having a higher priority exists so as to save the unnecessary waste of power. By avoiding the unnecessary routing action, the present invention is capable of saving power without affecting the normal use of the user.

16 Claims, 5 Drawing Sheets

PORTABLE ROUTING DEVICE AND A ROUTING METHOD

PRIORITY CLAIM

This application claims the benefit of the filing date of Taiwan Patent Application No. 101144875, filed Nov. 30, 2012, entitled "A PORTABLE ROUTING DEVICE AND A ROUTING METHOD," and the contents of which is hereby incorporated by reference in its entirety.

FIELD OF THE INVENTION

The present invention relates to a portable routing device and a routing method. More specifically, the present invention presents a portable routing device (system) and a routing method, which can utilize a bluetooth module to start a routing module. Thereby allowing the routing module of the portable routing device to only be opened when needed, which can directly and effectively reduce the waste of energy.

BACKGROUND OF THE INVENTION

A router is a computer network equipment that forwards data packets between computer networks, with the process thereof known as routing. With the development of wireless transmission technology, routers are now being developed into wireless routers. Wireless routers are communication equipment that connects a wired network and a wireless network. The wireless router can communicate with a personal computer or other electronic devices with a wireless data transmission function, such as a portable computer, by sending and receiving wireless signals through Wi-Fi or other wireless transmission technologies. However, wireless routers are too large to carry; therefore some manufacturers have designed portable wireless routers so that users can still use a network while away from home because of its lightweight design.

The portable wireless router in the prior art comprises a wireless router and a cellular data interface. Considering that most portable wireless routers connect to an external power supply for electricity, the problem of high power consumption of the portable wireless router is not very important. However, because of advances in technology, the portable wireless router can now be integrated into a mobile phone or other electronic devices. Thus, without the support of an external power supply, the power consumption of portable wireless routers has become an important consideration.

In the prior art, the portable wireless router will stay connected with an electronic device, even if the electronic device is in sleep mode. That is to say, the portable wireless router still keeps the connection with the electronic device even when the electronic device is not using the routing service, which causes the portable wireless router to waste energy. Therefore, figuring out a way to avoid unnecessary routing actions without affecting the normal use of the wireless router is a serious problem.

SUMMARY OF THE INVENTION

According to the above problems, the present invention discloses a portable routing device. The portable routing device is applied in a space where there is a network source and an electronic device. The electronic device has a B connection module and a B network module, wherein the B connection module is based on a connection protocol, and the B network module is based on a routing network protocol. The portable routing device comprises a network name and address module, an A connection module, a routing module and a control module. The network name and address module is used to manage, identify and provide a domain position signal. The A connection module is based on the connection protocol and coupled with the network name and address module. The routing module is based on the routing network protocol and coupled with the network name and address module, and has a working mode and a sleep mode. When the routing module is in working mode, the routing module is coupled with the network source and has a routing network so that the electronic device may access the network source. When the portable routing device is in sleep mode, the routing module is turned off and independent of the B network module of the electronic device. The control module is coupled with the network name and address module, the A connection module and the routing module in order to control the switch and the operation of the network name and address module, the A connection module and the routing module.

Wherein, when the routing module is in sleep mode, the A connection module of the portable routing device is still coupled with the B connection module. While the A connection module receives a domain name signal from the electronic device, the network name and address module can obtain the domain name signal from the A connection module and return a corresponding domain position signal to the electronic device, where the control module switches the portable routing device into working mode from sleep mode.

When the control module switches the routing module into working mode from sleep mode, the control module can selectively turn off the A connection module. In addition, the control module can automatically switch the routing module into sleep mode from working mode when the routing module criteria for a shutdown condition are met. However, the present invention is not limited to having this characteristic.

The above shutdown condition is a threshold of flow or flow rate, or a length of duration which corresponds to the threshold of flow or flow rate. In addition, the shutdown condition can also be that there is a prior network source in the space where the portable routing device is, and the priority of the prior network source is prior to the routing network. Importantly, to use the prior network source, the control module should have a predetermined priority table which has the priorities of a plurality of network sources and the routing network. The priority of the plurality of network sources and the routing network can be set by the users. Likewise, the present invention is not limited to having the above characteristics.

In addition, the above domain name signal is a signal that corresponds to DNS, while the domain position signal is a signal that corresponds to IP. Furthermore, the domain name signal can also be a signal that corresponds to HTTP, VPN, DLNA, SIP or XMPP.

Furthermore, the present invention also discloses a routing method, which comprises the following steps: preparing a network source, an electronic device and a portable routing device. Wherein, the portable routing device is coupled to the network source and comprises a routing module that has a working mode and a sleep mode. When the routing module is in working mode, the routing module has a routing network so that the electronic device may access the network source. When the portable routing device is in sleep mode, the routing module is turned off and independent of the B network module of the electronic device. To access the network source, the electronic device will then automatically send a domain name signal to the portable routing device so that the routing module of the portable routing device can be switched into working mode from sleep mode. Wherein, the domain name signal is a signal that corresponds to DNS, and the domain name signal comprises a domain identification signal which is used to identify a bluetooth module of the electronic device. With this method, saving energy can be achieved.

According to the above, the present invention discloses a portable routing device and a routing method. One of the main features of the present invention is that the present invention utilizes a domain name signal as a switch on signal so that the routing module of the portable routing device can be opened only when needed, thereby directly and effectively reducing the waste of energy. Furthermore, the present invention also utilizes other network sources to avoid unnecessary routing actions, which is helpful to conserving energy.

Many other advantages and features of the present invention will be further understood by the following detailed description and the appended drawings.

BRIEF DESCRIPTION OF THE DRAWINGS

To facilitate understanding, identical reference numerals have been used, where it is possible to designate identical elements that are common to the figures.

DETAILED DESCRIPTION

The present invention discloses a portable routing device, the corresponding routing system and a routing method. The portable routing device of the invention is used to share a network source to at least one electronic device, while the feature of the invention is to control the switch of the portable routing device so as to reduce the waste of energy.

More specifically, when a user has a plurality of electronic devices but only one of them has internet service, it will need to use a portable routing device to share a network to the other electronic devices so that the other electronic devices can also access the internet. However, in the prior art, network sharing between the portable routing device and the other electronic devices is still being utilized even when the other electronic devices are idle. In view of this, the present invention provides an innovative portable routing device to solve the problem in the prior art.

Figure 1:
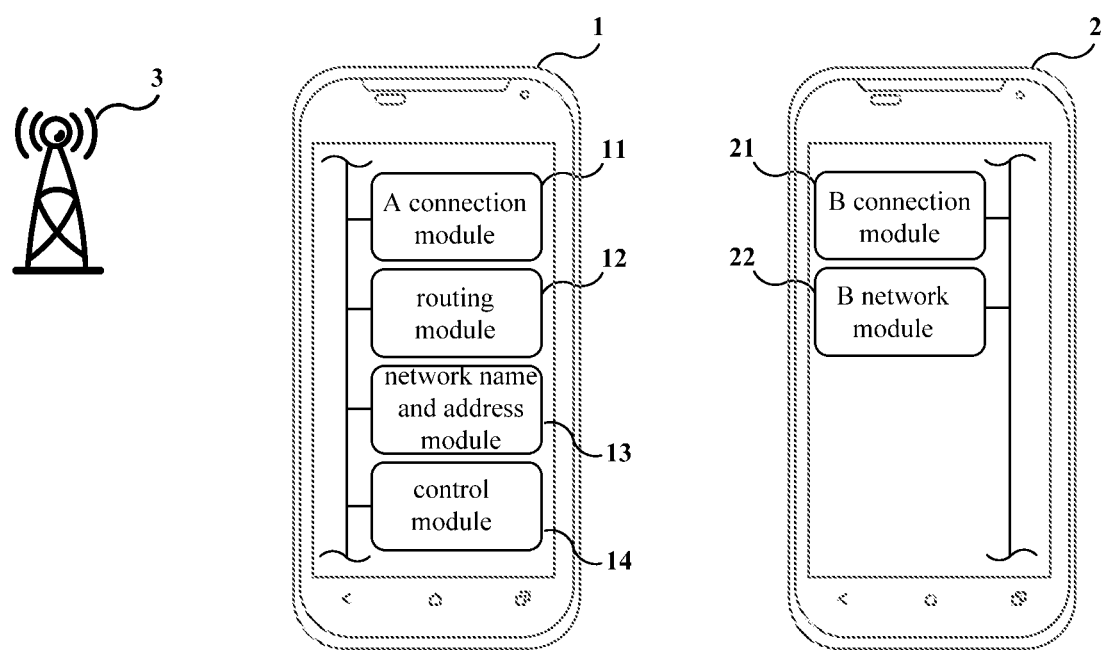
FIG. 1 is a function block diagram illustrating a portable routing device according to an embodiment of the invention.

The following is an embodiment about the routing system of the present invention. For its hardware, please refer to FIG. 1. FIG. 1 is a function block diagram illustrating a portable routing device according to an embodiment of the invention. As shown in FIG. 1, the present invention generally comprises a portable routing device 1, at least one electronic device 2 and a network source 3.

In this embodiment, the electronic device 2 is a touch-control electronic device that can access the internet by WIFI only, such as an iPad or a mobile phone. It is important to note that the electronic device 2 is not limited to the above devices but can be any other electronic device which can access the internet through the portable routing device 1 of the present invention, such as tablet PCs, mobile phones, laptop computers, cameras, etc.

The above electronic device 2 comprises a B connection module 21 and a B network module 22. In this embodiment, the B connection module 21 is a bluetooth module, and the B network module 22 is a WLAN module or a WIFI module.

Importantly, the B connection module 21 of the electronic device 2 is based on a connection protocol. In this embodiment, the connection protocol is a protocol corresponding to bluetooth communication technology. However, the B connection module 21 is not limited to only being based on a bluetooth module and its corresponding communication protocol but can also be based on other wireless PAN communication modules and protocols thereof, such as ZigBee, UWB, HomeRF, etc.

Alternatively, the B network module 22 of the electronic device 2 is based on a routing network protocol. In this embodiment, the routing network protocol is a protocol that corresponds to WIFI communication technology. To be more specific, the above WIFI communication technology is WLAN (Wireless Local Area Network) based on the IEEE 802.11 standard. However, the B network module 22 is not limited to only being based on a WIFI module and its corresponding communication protocol but can be based on other WLAN communication modules and protocols thereof, such as WIFI Direct, HIPERLAN, ZigBee, UWB, HomeRF, etc. In addition to the above B connection module 21 and the B network module 22, the electronic device 2 further comprises a CPU, memory, a cooling module, circuit boards, ports, a chassis and other components. However, in order to keep the specification simple, the following will only focus on the core components of the invention.

Alternatively, in this embodiment, the portable routing device 1 is an HTC J smartphone with mobile internet. However, the portable routing device 1 is not limited to the HTC J smartphone but can be any other portable wireless routers which is capable of sharing a network source 3 to other devices, such as mobile phones, laptops, tablet PCs, AP and internet sharing devices. Incidentally, the portable routing device 1 is not limited to having batteries or other electric storage modules and can rely on an external power supply. The external power supply can be mobile power, mains or other devices or components that can provide electric power.

In addition, the portable routing device 1 of the present invention comprises a network name and address module 13, an A connection module 11, a routing module 12 and a control module 14 coupled with the above modules. In this embodiment, the network name and address module 13 acts as a small database for mobile network access; the A connection module 11 is a bluetooth module; the routing module 12 is a WLAN module which is coupled with the network source 3 and has the ability to construct a routing network; the control module 14 is a CPU with computing power and the software thereof.

Importantly, in addition to the above network name and address module 13, the A connection module 11, the routing module 12 and the control module 14, the portable routing device 1 further comprises memory, a cooling module, circuit boards, ports, a chassis and other components. However, in order to keep the specification simple, the following will only focus on the core components of the invention.

In this embodiment, the above network name and address module 13 acts as a small database used to provide a domain name and domain position when accessing the network source, and further providing a renewed domain position signal through an external network name and address database. In the application, a function of the network name and address module 13 is outputting a corresponding domain position signal according to a received domain name signal. More specifically, the network name and address module 13 can output a signal comprising a domain position (For example: 140.112.255.255) according to a signal comprising a domain name (For example: www.google.com). Particularly, in this embodiment, the domain name signal is but not limited to a signal that corresponds to DNS, where the domain name signal can also be a signal that corresponds to HTTP, VPN, DLNA, SIP or XMPP.

Alternatively, the domain position signal can be in an IPv4 format, an IPv6 format or other formats that can be applied to contain the network location information, though the present invention is not limited to them. The specification of the A connection module 11 and the routing module 12 are generally the same as the specification of the B connection module 21 and the B network module 22, thus, it will not be repeated here.

The above network source 3 is an electromagnetic signal in LTE format transmitted by the base station, though the present invention is not limited to this. The network source 3 can also utilize other means or devices that can be used to connect to the internet, such as WIMAX, GPRS, EDGE, WCDMA, EVDO, TD-SCDMA, HS (D/U) PA, HSPA+, etc. In addition, the network source 3 of the invention is not limited to wireless but can also be from a wired network's signal.

After the above description on the hardware, the following description focuses on the operation. First, the routing module 12 of the portable routing device 1 has two operating modes: a working mode M1 and a sleep mode (suspend mode) M2. The working mode M1 means that the routing service of the portable routing device 1 is opened, and the sleep mode M2 means that the routing service of the portable routing device 1 is closed to conserve power.

Figure 2A:
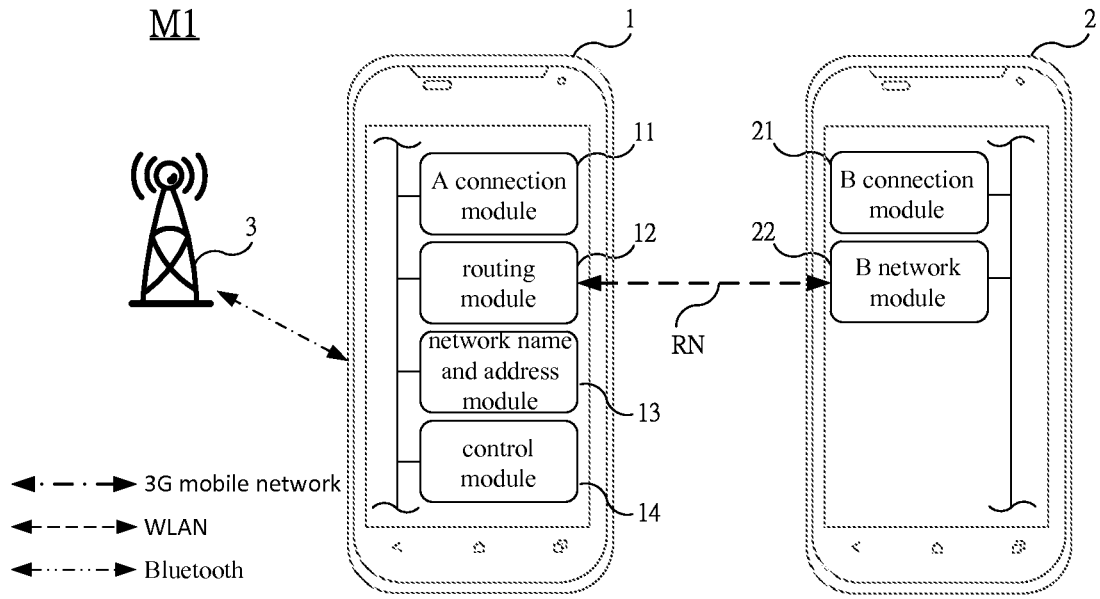
FIG. 2A is a schematic diagram illustrating a portable routing device in working mode according to an embodiment of the invention.

More specifically, please refer to FIG. 2A. FIG. 2A is a schematic diagram illustrating a portable routing device in working mode according to an embodiment of the invention. The routing module 12 can build a routing network for the B network module 22 of the electronic device 2 to connect to and access, thereby allowing the electronic device 2 to be coupled to and access the network source 3. When the packet flow or the packet amount during a predetermined time drops below a preset threshold, the portable routing device 1 can judge that the electronic device 2 is suspended, and then the portable routing device 1 can automatically be switched into sleep mode M2 from working mode M1 to conserve power.

Figure 2B:
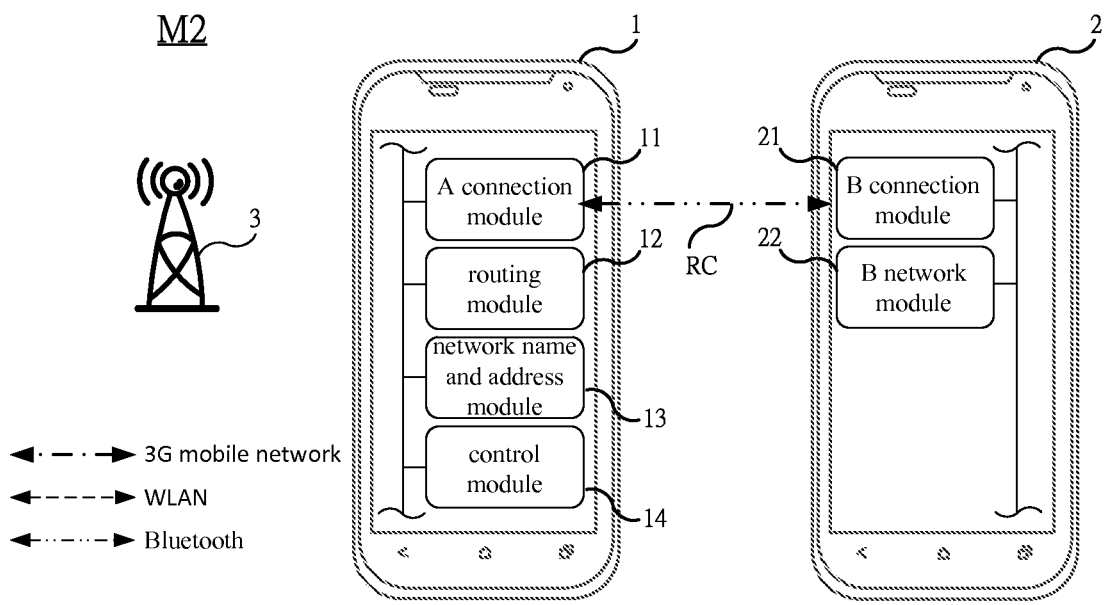
FIG. 2B is a schematic diagram illustrating a portable routing device in sleep mode according to an embodiment of the invention.

Please refer to FIG. 2B. FIG. 2B is a schematic diagram illustrating a portable routing device in sleep mode according to an embodiment of the invention. When the portable routing device 1 is in sleep mode M2, the routing module 12 is turned off. Therefore, there is no routing network for the B network module 22 of the electronic device 2 to connect and access. In other words, during sleep mode M2, the portable routing device 1 and the electronic device 2 are independent of each other. At the same time, the control module 14 makes the A connection module 11 open and coupled to the B connection module 21 so as to have a relative connection RC. In addition, the control module 14 can further selectively interrupt the connection with the network source 3 to further conserve power.

More specifically, before the establishment of the relative connection RC, the electronic device 2 has previously had a paired recognition and authentication settings with the A connection module 11 by the B connection module 21. The paired recognition and authentication settings are detailed in the prior art, thus, it will not be repeated here. Particularly, while the A connection module 11 and the B connection module 21 are in connection and have established the relative connection RC, the B connection module 21 can obtain a domain identification signal and routing information pointed to the network name and address module 13, which is fundamentally different from the prior art. The network name and address module 13 can use the domain identification signal to identify the networking need from the B connection module 21. With this method, the routing module 12 will open only when the electronic device 2 has networking needs.

When the user of the electronic device 2 needs to use internet, the electronic device 2 will automatically use the B connection module 21 to connect to the A connection module 11 of the portable routing device 1 through the relative connection RC. The B connection module 21 will then send a domain name signal to the network name and address module 13.

In this embodiment, the domain name signal is a signal in DNS format. After the portable routing device 1 receives the domain name signal from the B connection module 21, the control module 14 will do the following procedures. First, the network name and address module 13 will analysis the domain name signal and return a domain position signal to the B connection module 21. If the network name and address module 13 cannot analysis the domain name signal and is not coupled with the network source 3, the control module 14 will make the network name and address module 13 couple with the network source 3 again so that the name and address module 13 can analysis and transform the domain name signal into a domain position signal. In this embodiment, the domain position signal is in an IPv4 format. Importantly, the above domain name signal comprises the above domain identification signal which is used to identify the networking need from the B connection module 21.

Meanwhile, the control module 14 switches the routing module 12 into working mode M1 from sleep mode M2 to establish the routing network again for the electronic device 2 to use, as shown in FIG. 2A. Furthermore, the control module 14 can selectively turn off the A connection module 11 to conserve power. The A connection module 11 will be turned on automatically when the routing module 12 is switched into sleep mode M2.

Figure 3:
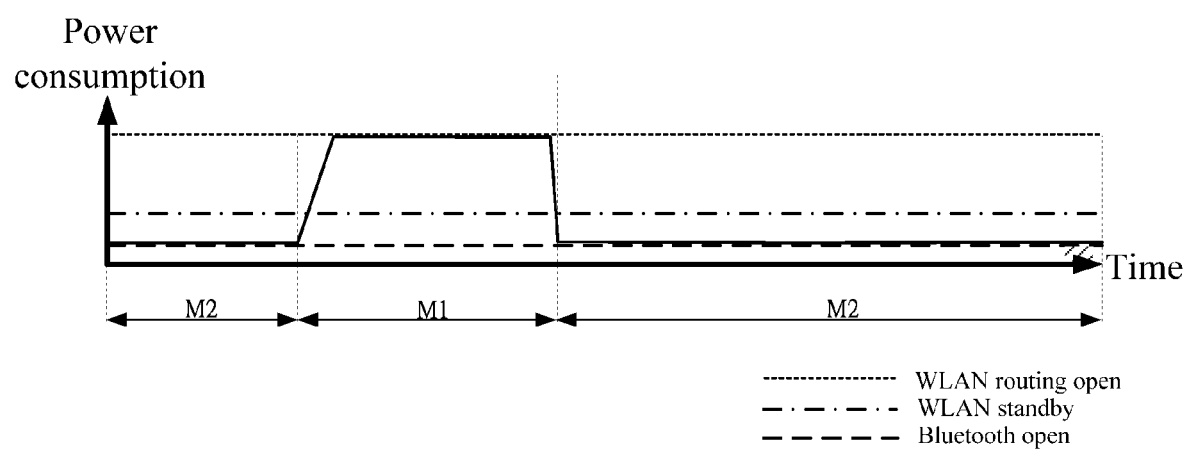
FIG. 3 is a schematic diagram illustrating the power consumption of a portable routing device according to the invention.

Please refer to FIG. 3. FIG. 3 is a schematic diagram illustrating the power consumption of a portable routing device according to the invention. The term "WLAN routing open" in FIG. 3 means that the routing module 12 is opened and a routing network is established. The term "WLAN standby" means that the WLAN module is connected to an external routing network. And the term "Bluetooth open" means that the A connection module of the invention is a bluetooth module and it is opened.

As shown in FIG. 3, the A connection module of the invention is still opened during sleep mode M2. However, the power consumption of the bluetooth module is much less than that of the routing module 12. Therefore, using the bluetooth module as the switch of the routing module 12 is still working to power saving. In addition, due to the design of non-hopping narrowband channel, the bluetooth communication technology can omit the step of exchanging response signals, thereby reducing the time required for restarting the portable routing device 1.

In addition, the portable routing device 1 further comprises a smart power saving function. In simple terms, the control module 14 will switch the routing module 12 into sleep mode from working mode as long as the routing module 12 criteria for a shutdown condition are met. The above shutdown condition is a threshold of flow or flow rate, or a length of duration which corresponds to the threshold of flow or flow rate. That is to say, when the packet flow or the packet amount during a predetermined time drops below a preset threshold, the control module 14 can judge that the routing module 12 is suspended and then turn off the routing module 12.

Figure 5A:
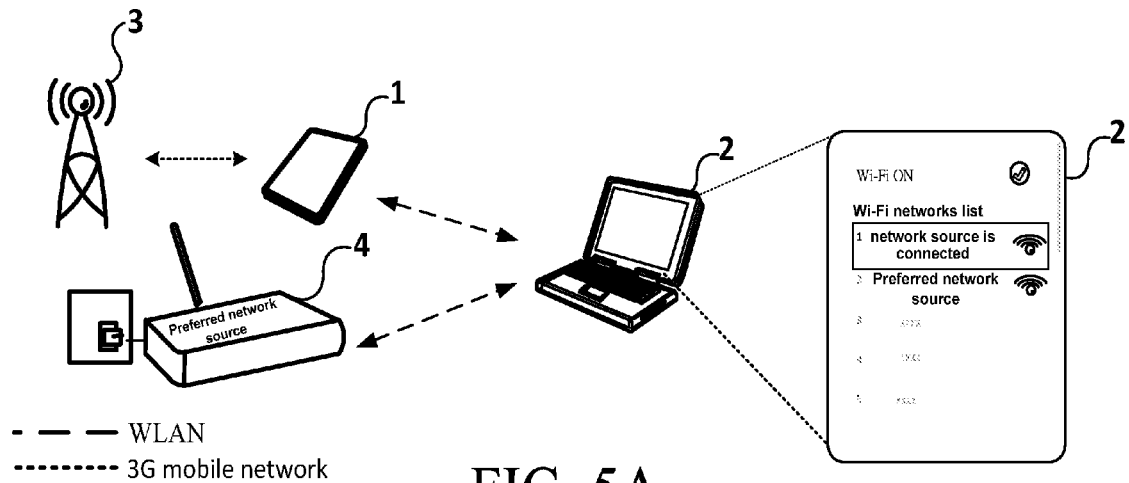
FIG. 5A and FIG. 5B are schematic diagrams about the priorities of network sources according to the invention.
Figure 5B:
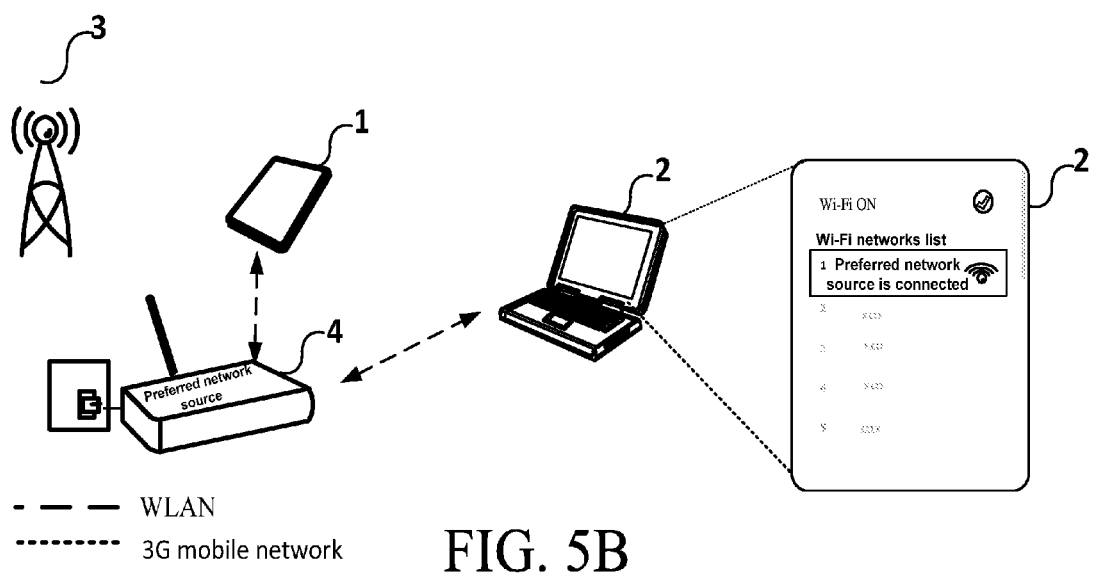

Please refer to FIG. 5A and FIG. 5B. FIG. 5A and FIG. 5B are schematic diagrams about the priorities of network sources according to the invention. The above shutdown condition can also be that there is a prior network source 4 in the space where the portable routing device 1 is. Because the priority of the prior network source 4 is prior to the routing network, the control module 14 turns off the routing module 12 so that the electronic device 2 can automatically connect to the prior network source 4. More specifically, the control module 14 comprises a predetermined priority table which has the priorities of a plurality of network sources 3 and the routing network, the priority of each network source 3 and the routing network can be set by the users. For example, if the priority of a home WIFI is prior to the routing network of the routing module 12, the portable routing device 1 will turn off the routing module 12 when detecting the home WIFI so that the electronic device 2 can automatically connect to the home WIFI. With this method, the power of the portable routing device 1 can be saved.

Figure 4:
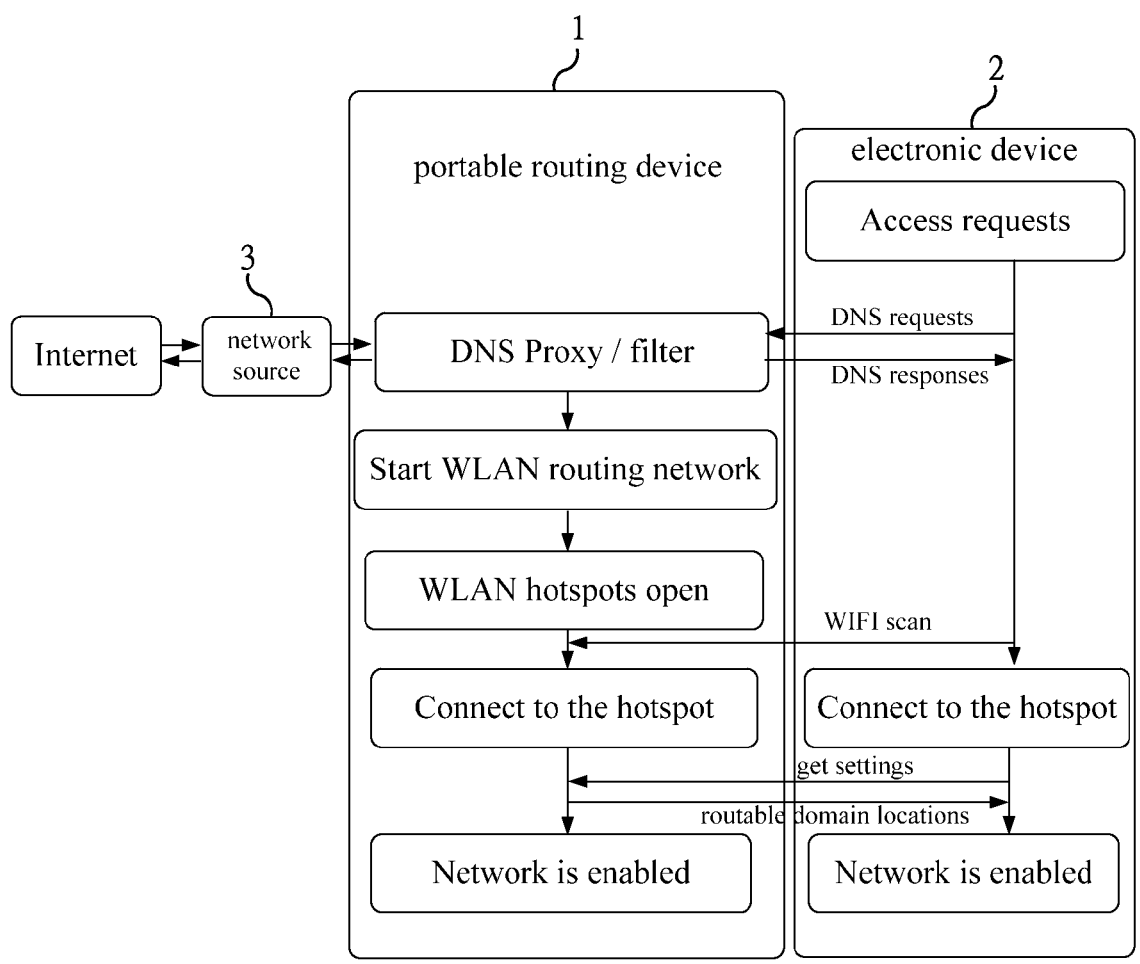
FIG. 4 is a schematic diagram illustrating the data stream between a portable routing device of the invention and an electronic device.

Finally, please refer to FIG. 4. FIG. 4 is a schematic diagram illustrating the data stream between a portable routing device of the invention and an electronic device. As the processes illustrated in the FIG. 4 are generally described in the above paragraphs, thus, it will not be repeated here. Importantly, the term "DNS requests" in FIG. 4 corresponds to the domain name signal, the term "DNS responses" corresponds to the domain position signal, and the term "hotspot" corresponds to the routing network. The term "routable domain locations" means Routable IP which is similar to the domain position signal. Different to the above domain identification signal which is used to identify the B connection module 21, the signal of routable domain location is for the B network module 22. With the signal of routable domain location, the electronic device 2 can access the network source 3 through the portable routing device 1.

According to the above, the present invention discloses a portable routing device and a routing method. One of the main features of the present invention is that the present invention utilizes a domain name signal as a switch on signal so that the routing module of the portable routing device can be opened only when needed, thereby directly and effectively reducing the waste of energy. Furthermore, the present invention also utilizes other network sources to avoid unnecessary routing actions, which is helpful to conserving energy.

With the examples and explanations mentioned above, the features and spirits of the invention are hopefully well described. Importantly, the present invention is not limited to the embodiments described herein. Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A portable routing device, applied in a space comprising a network source and an electronic device having a B connection module and a B network module, wherein the B connection module is based on a connection protocol, the B network module is based on a routing network protocol, comprising:
a network name and address module, used to manage, identify and provide a domain position signal;
an A connection module based on the connection protocol and coupled with the network name and address module;
a routing module based on the routing network protocol and coupled with the network name and address module, wherein the routing module has a working mode and a sleep mode, when the routing module is in the working mode, the routing module is coupled with the network source and has a routing network so that the electronic device may access the network source, and when the portable routing device is in the sleep mode, the routing module is turned off and independent of the B network module of the electronic device; and
a control module coupled with the network name and address module, the A connection module and the routing module, used to control the switch and the operation of the network name and address module, the A connection module and the routing module;
wherein, when the routing module is in the sleep mode, the A connection module of the portable routing device is coupled with the B connection module, when the electronic device has networking needs, the A connection module receives a domain name signal pointed to the network name and address module from the B connection module, the network name and address module can obtain the domain name signal from the A connection module and return a corresponding domain position signal to the electronic device, and the control module switches the portable routing device into the working mode from the sleep mode.

2. The portable routing device of claim 1, wherein when the control module switches the routing module into the working mode from the sleep mode, the control module also turns off the A connection module.

3. The portable routing device of claim 1, wherein the control module can automatically switch the routing module into the sleep mode from the working mode as long as the routing module meets a shutdown condition.

4. The portable routing device of claim 3, wherein the shutdown condition is a threshold of flow or flow rate, or a length of the duration which is corresponded to the threshold of flow or flow rate.

5. The portable routing device of claim 3, wherein the control module comprises a priority table which has the priority of a plurality of network sources and the routing network;
wherein, the shutdown condition is that the place where the portable routing device is has a prior network source, and the priority of the prior network source is prior to the routing network.

6. The portable routing device of claim 1, wherein the domain name signal is a signal corresponding to DNS, and the domain position signal is a signal corresponding to IP.

7. The portable routing device of claim 1, wherein the domain name signal is a signal corresponding to HTTP, VPN, DLNA, SIP or XMPP.

8. The portable routing device of claim 1, wherein the domain name signal comprises a domain identification signal which is used to identify the B connection module.

9. A routing method comprises the following steps of:
preparing a network source;
preparing an electronic device having a B connection module and a B network module, wherein the B connection module is based on a connection protocol, the B network module is based on a routing network protocol;

preparing a portable routing device coupled to the network source, wherein the portable routing device comprises a routing module having a working mode and a sleep mode, when the routing module is in the working mode, the routing module has a routing network so that the electronic device may access the network source, and when the portable routing device is in the sleep mode, the routing module is turned off and independent of the B network module of the electronic device; and making the electronic device automatically send a domain name signal to the portable routing device through the connection protocol so that the routing module of the portable routing device can be switched into the working mode from the sleep mode.

10. The routing method of claim 9, wherein the domain name signal is a signal corresponding to DNS, and the domain name signal comprises a domain identification signal which is used to identify the B connection module of the electronic device.

11. The routing method of claim 9, wherein the portable routing device further comprises a control module, when the control module switches the routing module into the working mode from the sleep mode, the control module also turns off an A connection module.

12. The routing method of claim 9, wherein the portable routing device further comprises a control module, the control module can automatically switch the routing module into the sleep mode from the working mode as long as the routing module meets a shutdown condition.

13. The routing method of claim 12, wherein the shutdown condition is a threshold of flow or flow rate, or a length of the duration which is corresponded to the threshold of flow or flow rate.

14. The routing method of claim 12, wherein the control module comprises a priority table which has the priority of a plurality of network sources and the routing network;
wherein, the shutdown condition is that the place where the portable routing device is has a prior network source, and the priority of the prior network source is prior to the routing network.

15. The routing method of claim 9, wherein the connection protocol is a bluetooth protocol.

16. The routing method of claim 9, wherein the domain name signal is a signal corresponding to HTTP, VPN, DLNA, SIP or XMPP.

* * * * *